F. E. MEYER.

PROCESS OF COATING REAL AND IMITATION PRECIOUS STONES.

No. 10,037. Reissued Feb. 14, 1882.

Witnesses

J. B. Thurston

Wm. A. Drewett.

Inventor

Francis Ed Meyer
By his attorney
M Randolph

THE NORRIS PETERS CO., PHOTO-LITHO., WASHINGTON, D. C.

UNITED STATES PATENT OFFICE.

FRANCIS ED. MEYER, OF NEW YORK, N. Y.

PROCESS OF COATING REAL AND IMITATION PRECIOUS STONES.

SPECIFICATION forming part of Reissued Letters Patent No. 10,037, dated February 14, 1882.

Original No. 236,608, dated January 11, 1881. Application for reissue filed January 20, 1882.

*To all whom it may concern:*

Be it known that I, FRANCIS ED. MEYER, of the city, county, and State of New York, have made certain new and useful improvements in a process for treating transparent or translucent real or imitation precious stones, compositions of glass or paste, for the purpose of coating them, or rather one side of them, with a highly-reflective substance, so as to enhance their brilliancy, and thus bring out to the best advantage the wonderful refulgence or luster of the gem, semi-gem, or imitation precious stones; and I hereby declare the following to be a full and clear description of my new process.

This invention is in the same line as and supplementary to Patents No. 223,237, 229,328, and 233,364, all being for improvements in real or imitation precious stones, and is designed to carry out and economically utilize the improvements set out in the said patents.

In this invention, as well as those above cited, a highly-reflective coating is applied to the lower part, rear side, or "collet" of the transparent or translucent real or imitation precious stone or gem; but the object of this invention is to speedily, thoroughly, and economically apply the said reflective coating, and this I now propose to do by first coating the whole of the real or imitation stone or gem with the reflective material, and then afterward removing the said reflective substance from the front side, face, or crown of the piece which is treated.

Figure 1:
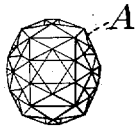
Figure 2:
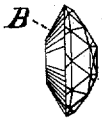
Figure 3:
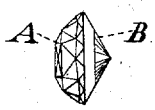
Figure 4:
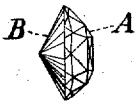

The invention will be readily understood by the accompanying drawings, of which Figure 1 is a front face view of one of the improved real or imitation precious stones or gems. Fig. 2 is a side elevation of the same, showing the back face or collet side truncated. Fig. 3 is a similar side elevation of the improved real or imitation precious stone, showing the reflective coating applied to only a part of the rear face or collet of the stone. Fig. 4 is also a side elevation of the improved real or imitation precious stone; but in this view the whole of the rear face or collet of the stone is coated with the reflective substance.

The piece A which is to be treated may be any transparent or translucent real or imitation precious stone, gem, or semi-gem, compositions of glass or paste, and the crown or front face may be cut into any polygonous or desired shape, and the collet, lower part, or rear face may be faceted or plain, a full or truncated cone, or made in any desired shape. The whole of the exterior face of the real or imitation precious stone, composition of glass or paste, will first be entirely coated with some highly-reflective substance, either by the nitrate-of-silver process or any other suitable reflective-coating process, and then the reflective coating fixed in place by the application of a due degree of heat, or in any other suitable way. I then finish the collet or back or rear part of the real or imitation stone or gem with some protecting substance—such as varnish, wax, or such other like protecting substance—after which a coating of bronze or gilt will be applied to the exterior of the said varnish or wax, substantially as described in the former patents granted to me on this subject, said patents being respectively numbered 223,237, 229,328, and 233,364. After this back or protective coating shall have been fully fixed, as above described, I remove or take off all of the reflective substance from the crown or front face of the real or imitation stone or gem so treated, possibly by acid, or by some polishing material, or by means of a fine buffer, or by any other suitable means, so as to allow the reflective coating which has been applied to the rear part or collet of the rear or imitation stone or gem to reflect the light back through the front face or crown, thereby greatly enhancing the brilliancy of the real or imitation stone or gem, substantially as in my former patents above cited.

The reflective substance applied, as above described, to the rear or collet side of the stone or gem is coated with a metallic protective covering by means of a battery, either before or after the reflective coating shall have been removed from the front face or crown of the real or imitation stone or gem, or this metallic covering may be applied by any other means equivalent to the deposit by an electromagnetic battery. The process of coating these stones or gems with a protective metallic armor is quite similar to that used for electroplating, with only such practical modifications thereof as shall be required for this particular purpose.

The important point in this invention consists in simplifying the coating process by applying the coating, which is represented by the letter B in the drawings, to the whole of the exterior surface of the real or imitation stone or gem, and then removing the said reflective substance from the front face or crown of the said stone or gem, and by so doing the process of coating the said stones or gems is much easier applied than by the process of coating with the reflective substance only the rear or collet side of the stone or gem, as described in my former patents above alluded to.

Having described my invention, I claim—

1. The process herein described of applying a reflective coating, B, to the rear face or collet of a real or imitation precious stone or gem, composition of glass or paste, A, by first coating the said stone A entirely with the reflective material B, and then removing by any suitable means the reflective coating from the front face or crown of the said stone or gem.

2. The process of protecting the outside of the reflective coating on the collet side of the stone by means of an electroplating or a metallic shield, substantially as described.

3. The electroplated covering or cap for the reflective substance, applied to and combined with the reflective cap B, substantially as described.

4. The application by electricity of a solid metallic coating or cap on the back or collet of a real or imitation precious stone, paste, or gem on the outside of a reflective substance, B, which has been previously placed on the said collet side of the stone.

FRANCIS ED. MEYER.

Witnesses:
M. RANDOLPH,
J. B. THURSTON.